Jan. 6, 1953
C. W. DAVIS
2,624,784
ELECTRONICALLY CONTROLLED RELAY
Filed May 31, 1949
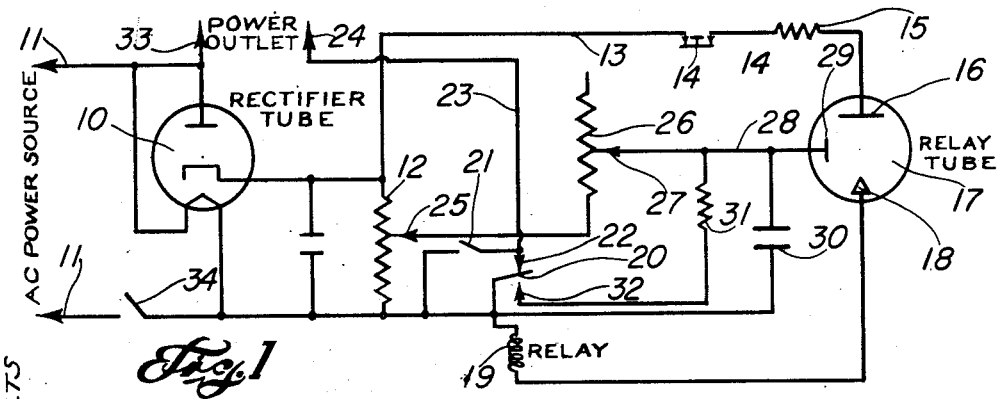
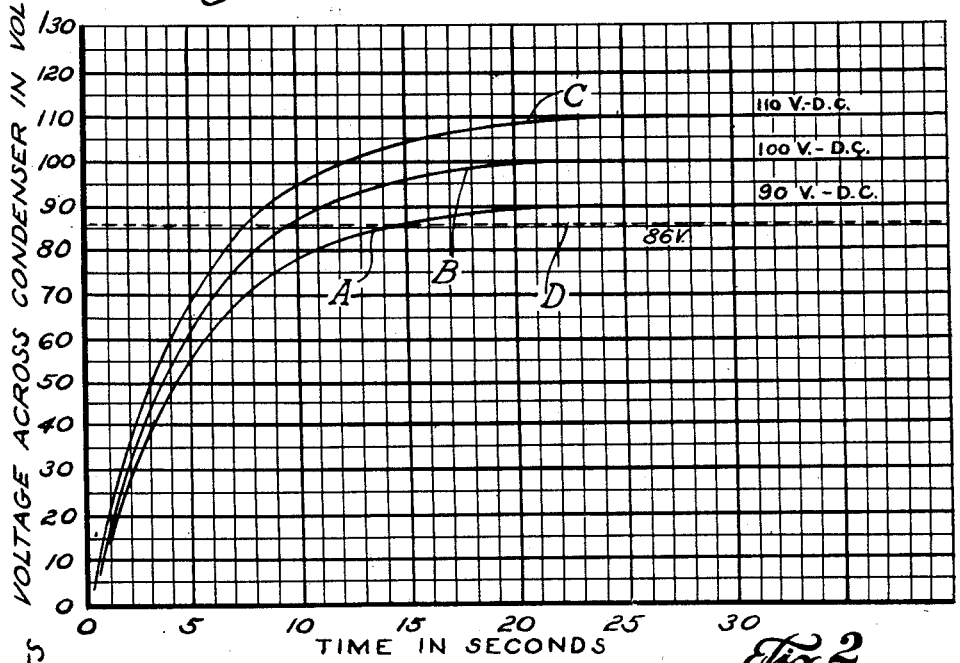
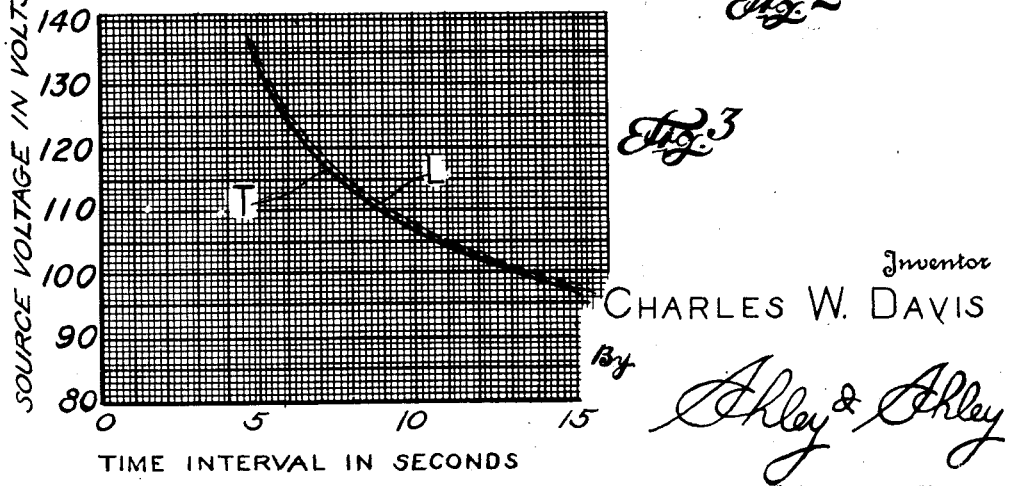
Inventor
CHARLES W. DAVIS
By
Ahley & Ahley Patented Jan. 6, 1953

2,624,784

UNITED STATES PATENT OFFICE 2,624,784

ELECTRONICALLY CONTROLLED RELAY

Charles W. Davis, Grand Prairie, Tex.

Application May 31, 1949, Serial No. 96,301

7 Claims. (Cl. 175—320)

This invention relates to new and useful improvements in timers for electrical devices.

In the past, there have been developed a number of devices for measuring timed intervals of a definite length and for making compensation, in the case of the timed supply of electric current, for variations in the voltage of said current. Although there are many applications in which such devices may be employed, a particularly facile example is encountered in the use of photographic enlargers.

As is well known, photographic enlargers employ an electric lamp for projecting light through a photographic negative onto a sensitized surface such as enlarging paper. The time interval for which the enlarger is employed, or the period of exposure of the enlarging paper, must be varied in accordance with the quality of the photographic negative being handled and in accordance with the type of enlarging paper used and the quality of prints desired. In reality, the time of exposure is merely a method of measuring the quantity of light projected onto the paper to obtain the requisite and proper exposure.

It is further well known that the intensity of an electric lamp, or the lumens which it emits, is proportional to the voltage of the electric current applied to the lamp, and it thus follows that to determine accurately the quantity of light projected onto the enlarging paper in a photographic enlarger, a constant voltage must be applied to the enlarger lamp in order to permit the quantity of light to be controlled through time of exposure alone. In practice, the voltage of commercial power supplies vary to a considerable extent, and hence, the method of using the time of the illumination of the lamp as a means of determining the quantity of light delivered becomes unreliable and inaccurate.

Obviously, there are many other instances in which similar problems arise, and this invention is not to be limited to use with photographic enlargers alone. For the sake of simplicity and convenience, however, reference will largely be made to use of the device in connection with photographic enlargers because the latter are well known and widely understood and furnish an extremely convenient example for explaining the principles and operation of this invention.

It has been found that a constant exposure or a constant quantity of light may be obtained by increasing the time of illumination of the electric lamp as the voltage applied to the lamp decreases and by decreasing the time of illumination as the voltage applied increases. Thus, with the present invention, it is possible to eliminate the errors and inaccuracies due to variation of commercial power supplies, and to obtain at all times a predetermined quantity of illumination or light.

An electric lamp may be viewed as an electrical device which consumes a given quantity of electric energy and in turn emits a given quantity of light. As the voltage applied to the lamp decreases, the current flowing through the lamp filament will decrease and less light will be emitted. Therefore, to expose a surface of a given size spaced a given distance from the lamp to a certain quantity, or lumen-seconds, of light, it will be necessary to apply a reduced electrical voltage a longer period of time since less light is emitted when the voltage is reduced and a longer time will be required for the lamp to emit the given quantity of light or illumination. The efficiency of an electric lamp does not remain constant with varying voltages, but the rate of emission of light changes much more rapidly than the change of power to the lamp when the supply voltage changes. For instance, when less than normal voltage is applied to a lamp its power consumption is reduced by a greater percent than the percent reduction in the voltage. Furthermore, the rate of emission of light is reduced by a still greater percentage. Therefore, a longer period of time will be needed at the reduced voltage, than at the normal voltage, for the lamp to emit a given quantity of light. The relation between the reduction in voltage and the reduction in the rate of emission of light can be determined for any lamp and can be expressed as a mathematical equation. Since the objective is to utilize a given quantity of light, heat or other energy, the proximate generalization may be made that the present invention, in the case of a photographic enlarger, seeks to obtain a predetermined quantity of light energy by controlling the time of the exposure in accordance with the established relation between the supply voltage and the emission of light by the lamp used.

Since other electrical devices have in general the same characteristics as an electric lamp insofar as consumption of power under varying voltage conditions and in converting such power to the desired form of energy, the rule may be extended to include all electrical devices from which a fixed quantity of energy output is desired. In the case of an electric lamp, the invention seeks to obtain a fixed or predetermined quantity of light, or lumen-seconds. In the case of an electrical heater, the invention would seek the obtaining of a given quantity of heat energy or calories. The reasoning is readily and obviously extended to the many other electrical devices presently in use which are susceptible to control by the present invention.

It is therefore one object of this invention to provide an improved voltage sensitive timing device which will control an electrical device to cause it to emit or provide fixed or predetermined quantities of energy in a desired form regardless of the variation of the electrical voltage supplied to said timing device.

An important object of the invention is to provide an improved voltage sensitive timing device which is extremely simple and compact in structure and is reliable and efficient in operation.

A particular object of the invention is to provide an improved voltage sensitive timing device having provision for varying the timing operation in accordance with the characteristics of the electrical device being controlled whereby the tendency of such electrical device to change its performance as the voltage supply varies, may be substantially eliminated or cancelled.

A still further object of the invention is to provide an improved device of the character described which measures a time interval in accordance with the charging time of a condenser and employs such measurement to control an electrical device and cause it to operate for a time sufficient to convert or pass a quantity of electrical energy sufficient to provide a fixed or predetermined quantity of the type of energy desired, such as light or heat.

Yet another object of the invention is to provide an improved device of the character described employing a condenser and a relay tube having a known firing potential, and wherein a varying voltage, which bears a definite relationship, adjustable over a wide range, to the varying supply voltage, is applied to the condenser until such condenser is sufficiently charged to fire the relay tube, the charging interval of the condenser under such conditions determining the time of operation of the electrical device being controlled by the timing device.

A further object of the invention is to provide an improved device of the character described having means for adjusting and selecting the quantity of energy of the desired form emitted by the controlled electrical device.

A general object of the invention is to provide a timing device for the control of any process, involving time, which is subject to error due to variations in the application of energy, in any form, so long as the process is susceptible to control by electrical means and provided that the variation in the application of energy can be represented by a similar variation in electrical potential which is applied to the timing device.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a schematic view illustrating the wiring diagram of a voltage sensitive timing device constructed in accordance with this invention, Fig. 2 is a graph showing the characteristic charging curves of a condenser when different electric potentials are applied thereto, and Fig. 3 is a graph of source voltage plotted against the time of illumination necessary to provide a constant quantity of light, the curve being for a characteristic electric lamp and having superposed thereon the characteristic curve of the output of the present timing device when adjusted to match this particular lamp.

It is well known that electrical condensers do not charge instantaneously when an electrical potential is applied thereto through a resistance. I have used this characteristic of condensers in my present invention and am able thereby to eliminate variations in operation of an electrical device due to variations in the electrical potential supplied. It is further known that a condenser will charge to the full applied voltage in a short period of time of application of said voltage, but that during the charging interval, the voltage or potential across the condenser at any given instant will be proportional to the applied voltage or potential. A family of charging curves is shown in Fig. 2 of the drawing, curve A representing the charging curve of a given type of condenser when a 90 volt direct current is applied thereto. In similar fashion, curves B and C represent the charging curves when 100 volts and 110 volts, respectively, direct current are applied to the condenser. It will be noted that the condenser, in each instance, becomes fully charged in approximately 25 seconds so that the voltage across the condenser is equal to the applied voltage. At 10 seconds, however, the voltage across the condenser is different in each case and is dependent upon the voltage being applied. By associating with a condenser a relay tube or electrical valve having a firing potential or minimum actuating voltage below the lowest anticipated voltage of the power supply, I am thus able to fire the relay tube at the end of charging intervals which will vary in accordance with the voltage applied.

In Fig. 1 is shown the wiring diagram of a timing device for employing this principle of operation. Of course, the condenser and relay tube arrangement requires direct current for operation, and a rectifier tube 10 is connected across the alternating current power leads 11 for furnishing such direct current. This portion of the invention is not novel and may be of any customary or desired arrangement. In the event direct current is available, the rectifier would, of course, not be necessary.

The output of the rectifier is placed across an adjustable rheostat or voltage divider 12, one end of which is connected by a conductor 13 through a normally closed switch 14 and resistor 15 to the plate 16 of a relay tube 17. Several types of commercial tubes may be employed as the relay tubes 17, the tubes commonly designated OA4G and 1267 being readily suitable for this purpose. Of course, other tubes can be used or adapted for use, it being only necessary that the tube have the characteristic of being non-conductive under normal conditions and of firing when a certain critical potential is applied thereacross. After firing, the tube must remain conductive until the flow of current is momentarily interrupted. In addition, it is desirable that the firing potential of the tube remain constant and be independent of external conditions. Of course, in actual practice when a tube conducting a current is subjected to a decreasing voltage, there will be a point at which the tube will become non-conductive. This is usually at such a low voltage, however, that it need not here be considered.

The cathode 18 of the tube 17 is connected through the coil 19 of a suitable relay to the opposite end of the rheostat 12, and is also connected to the armature 20 of said relay. The relay is of the double contact variety in which the armature closes with a contact in both the energized and the unenergized conditions of said relay. A shorting switch 21 is connected between the armature 20 and the upper or unenergized position contact 22. The contact 22 is also connected by a suitable conductor 23 to one side 24 of the controlled power supply or outlet.

The movable or adjustable contact 25 of the rheostat 12 is connected to one end of a second adjustable rheostat 26 and the adjustable contact 27 of the second rheostat is connected through a conductor 28 with an electrode 29 positioned within the relay tube 17. A condenser or accumulator 30 is connected between the conductor 28 and the armature 20 of the relay, while a suitable resistor 31 is connected between the conductor 28 and the lower contact point 32 of the relay which is engaged by the armature when the relay is energized.

One of the power supply leads 11 is connected directly to the second side 33 of the controlled power outlet, and a cutoff switch 34 is interposed in the opposite lead 11 for rendering the entire device inoperative.

In the operation of the device, the switch 34 is closed thereby energizing the rectifier 10, and after a suitable warm-up period, direct current voltage is impressed across the rheostat 12. Closing of the switch 34 also connects with the power source the power outlet leads 33 and 24 through the armature 20 and the contact point 22. After the rectifier system has warmed up and is producing direct current voltage, the condenser 30 is charged through the rheostat 26 by the D. C. potential appearing on the lower part of rheostat 12 (from the movable contact 25 to the end of rheostat 12 that is connected to the armature 20 of the relay) until it reaches the firing potential of the relay tube. When this occurs, the tube fires and becomes conductive between the plate 16 and the cathode 18. In this manner, a circuit is established through the coil 19 of the relay which moves the armature 20 into engagement with the lower contact point 32 and discharges the condenser 30 through the resistor 31. At the same time, the connection to the lead 24 is broken since the armature has moved away from the contact point 22, and voltage is no longer applied at the controlled power outlet represented by the leads 24 and 33. The device will continue to function and will remain in this condition until further manipulation is had. The device is now ready for timing operation.

The switch 14 is of the normally closed type and is adopted to break momentarily the circuit through the conductor 13 when said switch is actuated. Momentary actuation of the switch 14 will break the circuit through the relay tube 17 and cause that tube to become nonconductive. When this occurs, the current through the relay coil 19 is terminated and the armature moves into engagement with the upper contact point 22. At this time, the controlled power outlet is again energized, and power is applied to whatever electrical device may be connected with said outlet. At the same time, the condenser 30 begins to charge since it is no longer shorted through the resistor 31, and the power outlet remains energized during this charging period. As soon as the voltage across the condenser 30 equals the critical firing potential of the relay tube 17, the tube fires between the electrode 29 and the cathode 18, thereby rendering the tube conductive and again establishing an electrical circuit through said tube. The coil 19 of the relay is now again energized, whereby the armature 20 is drawn from engagement with the contact 22 into engagement with the contact 32, thereby shorting the condenser 30 through the resistor 31 and interrupting the supply of power through the power outlet leads 33 and 24. It will thus be seen that the power outlet is energized for the length of time required for the condenser 30 to charge to the critical firing potential of the relay tube 17 and that a timed interval of energization is provided.

The characteristics of condensers discussed hereinbefore of charging at different rates in accordance with the voltage applied, is employed to provide a substantially constant result from or effect of, the energy delivered to the device that is controlled through the power outlet of the timer. As illustrated in the curves in Fig. 2, as the voltage applied to the condenser is decreased, the time required for the voltage across the condenser to reach a certain value is increased. Conversely, as the applied voltage is increased, the time required for the condenser to reach a specified voltage is decreased. The time of charging of the condenser thus varies inversely as the applied voltage.

As previously recited, different types of tubes may be employed as the relay tube 17, but it is necessary that the firing potential of said tube be below the lowest anticipated voltage of the commercial power supply. In the instance of the OA4G tube a critical firing potential of approximately 86 volts is had. This figure is approximate and may vary between individual tubes, but it may safely be stated that the firing potential will not be higher than 90 volts. It may also be safely stated that the voltage of ordinary 110 volt 60 cycle alternating current as commercially supplied will not drop below a voltage of 90 or increase above a voltage of 130. Thus, there is always a sufficient potential to equal or exceed the firing potential of the relay tube.

As the voltage of the commercial supply drops, it will be necessary to increase the timed period in order to obtain a fixed quantity of light from a lamp connected to the power outlet. Likewise, as the voltage increases, it will be necessary to decrease the time of the interval to maintain the quantity of light delivered at a constant value. This device accomplishes this simply through the use of the charging characteristics of the condenser 30. A firing potential of 86 volts has been indicated in Fig. 2 by the dash line D extending horizontally across the graph. The points of intersection of the lines A, B and C with the line D represent the time required for the condenser to charge to the points necessary to fire the relay tube 17. It will thus be observed that when 110 volts are applied across the condenser, a timed interval of 7.9 seconds is had. When 100 volts is applied, an interval of 9.7 seconds is had, while the application of 90 volts requires a time interval of 15 seconds for the condenser to reach the critical firing potential of the relay tube. Thus, as the commercial power supply decreases in potential, the time during which power is supplied to the power outlet is increased and a constant quantity of light may be obtained from the lamp connected to the outlet. The varying of the commercial power supply is thus compensated for by the varying in charging time of the condenser 30.

The way in which the charging time of condenser 30 varies with variations in the voltage of the power supply can be changed by adjusting the movable contact 25 of the voltage divider 12, thus allowing the timer to compensate for the effect of varying power supply voltage on devices of various characteristics. The results obtained from the device connected to the outlet can be changed by varying rheostat 26, i. e., for any given voltage the time interval can be changed by varying rheostat 26. As the portion of said rheostat in series with the conductor 28 is increased, it is manifest that the charging time of condenser 30 is increased. The condenser voltage applied and the charging time of the condenser may be set at any desired value.

Nearly all electrical devices are intended to operate most satisfactorily and beneficiately at a certain fixed voltage, normally 110 volts A. C.

For the purpose of explaining the variation in timing achieved by the present invention, it will be assumed that a constant alternating current power source of 110 volts is available and that the voltage of this power supply remains constant throughout the operations. Under these conditions, the voltage or potential supplied through the rheostat 12 may be more or less than 110 volts direct current, but it will remain at a certain fixed value. The movable contact 25 of rheostat 12 is employed to change the voltage applied to the condenser 30 through rheostat 26, and this voltage may be as high as the full voltage across rheostat 12. The rheostat 26 is employed to select the time interval to be obtained by charging condenser 30. If desired, the rheostat 26 may be calibrated in time intervals, such as seconds, and the movable contact 27 selectively positioned so as to make the resistance in series with condenser 30 of such magnitude that the indicated period of time will be required for charging of the condenser to the firing potential of the relay tube. The rheostat 26 thus serves as a means for varying and selecting the time of operation of the electrical device connected to the power outlet represented by the leads 24 and 33.

Now, assuming that the rheostat 26 remains in one fixed position, the electrical device which is being controlled will be operated for a definite period of time so long as the alternating current power supply remains at normal voltage. As the supply of voltage varies, however, the time of operation of the electrical device will automatically be varied to compensate for the changes in voltage of the power supply. This occurs by reason of the change in charging time of the condenser 30 with the change in voltage of the power supply It is further noted that the switch 21 may be employed for energizing the power outlet at any time without affecting the operation of the control device or setting its timing procedure into operation. This is of particular importance when the device is employed with a photographic enlarger and it is necessary to illuminate the enlarging lamp for short periods of time to permit focusing of the enlarger. However, as soon as the switch 21 is opened the device again resumes control of the enlarger lamp or other electrical device, and a timed exposure or timed operation may be obtained through adjustment of the rheostat 26 and momentary opening of the switch 14.

The values and electrical characteristics of the various elements of the control device will be determined to a large extent by the operating conditions encountered and by the nature of the electrical device which is to be controlled. Obviously, a device consuming large amounts of power would require a timing device of large capacity, while a device, such as an enlarger lamp, which uses small amounts of power may be controlled by a relatively simple and low capacity unit. The selection of the particular elements to fit a specific use of the device is well within the skill of persons familiar with this art, and no attempt will be made to enumerate all of the various changes and alterations which could readily and easily be made. The invention is concerned principally and primarily with the use of a relay tube which will normally function to maintain the circuit to the power outlet in an open condition with provision being made for interruption of such function during the charging time of a suitable condenser to a voltage level equal to the firing potential of said relay tube. The timed interval is the charging interval of the condenser.

In further explanation, a description will be given of the device as arranged for the control of a photographic enlarger lamp. In this case, a 4 microfarad, 1000 volt, condenser might be used as the condenser 30. The rheostat 26 could have a rating of 15 megohms, and is of an adjustable or variable nature. The rheostat 12 could have a rating of 10,000 ohms, and of course functions both as a bleeder for the rectifier tube and as a voltage divider for supplying direct current voltage to the condenser 30. The resistor 15 is not critical, since it merely limits the current flowing through the relay tube 17. A 5,000 ohm resistor could be used at this point. The resistor 31 is also not critical since it merely limits the current flowing when the condenser 30 is shorted and serves to protect the condenser, it having been found that a rating of 5000 to 10,000 ohms is adequate for this particular element.

It is pointed out that as the values of the various electrical elements in the timing device are changed, the electrical characteristics of the device changes, and this fact must be kept in mind in selecting the various elements. The operating characteristics of the electrical device which is being controlled will be known, and a person skilled in this art will know the characteristics of operation of an ideal or perfect device. Stated in other terms, in the case of an electric lamp, the characteristics of operation of an ideal or perfect electric lamp are known and may be calculated. In Fig. 3, the dotted line curve marked L, which is a parabolic curve, represents the plotting of applied voltage against the time of illumination required for a specific lamp to emit a given quantity of light, i. e., a definite number of lumen-seconds. This curve then represents the reaction of the electric lamp to the application of a varying power supply, and in order to compensate for this change in lamp operation, it is necessary to match the operation of the timing device as closely as possible to the operation of the lamp to provide nearly 100 per cent compensation. The solid line curve in Fig. 3, marked T, which is an exponential curve, represents an actual operating curve of a timing device constructed in accordance with this invention and in which the rheostat 12 was set to match the voltage-time characteristic of the timing device to that of the lamp, and rheostat 26 was set to make the timer curve fall near the lamp curve. It is seen that the curves very closely conform to one another and that almost 100 per cent compensation is had.

It is to be noted at this point that the various curves and values which have been given are not to be considered as limitations but merely as explanatory examples.

In actual practice, the curve L may be determined empirically, or in some instances, it may be calculated when the characteristics of the electrical device at hand are sufficiently well known and determined. Having plotted the actual operating curve of the electrical device as affected by variations in the voltage of the power source, it is then necessary to vary and adjust the timing device to cause its operating curve to conform as closely as possible to the operating curve of the electrical device. This may not always be accomplished with absolutely complete success, but it is usually possible to achieve a very close approximation, especially within the normal expected range of operating voltages.

First, the average slope of the timer curve T may be varied over wide limits by adjustment of the rheostat 12 to select the particular condenser charging curve that will be used at normal voltage. Further, the values of rheostat 26 and condenser 30 may be chosen to give time intervals of the proper order. Although the desired curve may be obtained, it may not closely approximate the actual operating curve L of the electrical device and it will be necessary to shift the curve T laterally by variation in the size of the rheostat 26 and by variation of the portion of the rheostat used for time selecting purposes. By this means, the timer curve T may be shifted until it closely approximates the operating curve L of the electrical device, and what, for all practical purposes, is complete compensation of varying source voltage may be obtained. Thus, in practice, the elements of the timing device are selected, and the rheostats are adjusted to provide an operating curve closely approximating the operating curve of the device being controlled. Further adjustment or selection of the timed interval may be effected by adjustment of the rheostat 26 over the operating range which has been previously set by the matching adjustment made in correlating the timer to the device being controlled. Such selection and adjustment is well within the capabilities of persons skilled in this art and must be determined by the nature of the device being controlled.

The value of the ratio of the supply voltage to the D. C. voltage applied to the condenser 30 through rheostat 26 (which I call "$r$") determines which part of the timer curve is to be used with the process curve. This makes the timer vary almost exactly as the process for changes in the supply voltage over a wide range. Each point of the timer curve is moved the same distance vertically when "$r$" is changed. The value of "$r$" can be found by selecting two points on the lamp curve where it is desired that the timer curve cross, and then solving for "$r$." For special applications it would be best to find the value of "$r$" that would make the slope of the timer at some selected point the same as the slope of the lamp curve at that point.

The value of RC (called the time constant) is changed to make the timer curve fall on top of the process curve after "$r$" has been selected. This is done when more time is needed, as when more exposure is given to a print. Changing RC does not move all points of the curve an equal distance horizontally, but neither does changing "C" move the lamp curve so. Therefore the two curves stay together when RC is changed, as C of the lamp equation is automatically changed at the same time.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A timing control for electrical devices including, an electronic tube having a critical firing voltage, a cathode and an anode in the tube, a starter electrode in the tube, a first pair of conductors connected to the anode and cathode and adapted to be connected to a source of electrical energy, a relay having an armature coil and a normally-closed switch which is closed when the relay is de-energized and a normally-open switch which is open when the relay is de-energized, energization of the relay by energization of the armature coil opening the normally-closed switch and closing the normally-open switch, the relay having an armature actuated by means of the armature coil, both switches having one pole carried by the armature, the relay armature coil being connected in series with the anode and cathode, a switch connected in series with the anode and cathode for interrupting the flow of current therethrough, an accumulator having positive and negative poles connected between the starter electrode and the negative one of the pair of conductors, the starter electrode being connected to the positive pole of the accumulator and electrically connected through an electrical resistive element to the positive one of said conductors, a discharge circuit connected in parallel with the accumulator between one side of the accumulator and the normally-open switch, a power outlet having one conductor connected to the normally-closed switch, and a pair of power supply leads, one of said leads being connected to the other conductor of the power outlet, the other of said leads being connected to the poles of both switches carried by the relay armature.

2. A timing control for electrical devices including, positive and negative power supply leads, a relay having an armature coil and a normally-closed switch which is closed when the relay is de-energized and a normally-open switch which is open when the relay is de-energized, energization of the armature coil opening the normally-closed switch and closing the normally-open switch, a power outlet connected to the power supply leads through the normally-closed switch and energized when the relay is de-energized, a gas-filled relay tube having a critical firing voltage and a plate and a cathode and a starter electrode, the plate and cathode being connected in series with the relay armature coil so that the relay is energized when a plate current flows through the relay tube, the plate-cathode-armature coil series circuit being adapted to be connected to a source of electrical energy, an electrical accumulator, the accumulator being electrically connected to the positive and negative power supply leads so as to be charged therefrom and having its positive side connected to the starter electrode whereby as the accumulator is charged from the power supply leads the potential of the starter electrode is made more positive, an electrical resistive device in the connection between the positive side of the accumulator and the positive power supply lead, a discharge shunt connected across the accumulator through the normally-open switch, and a switch in the plate-cathode-armature coil series circuit for interrupting the plate current to de-energize the relay and close the normally-closed switch to energize the power outlet and open the normally-open switch to disconnect the discharge shunt and permit the accumulator to commence charging.

3. A timing control as set forth in claim 2, and a voltage ratio selecting means connected between the accumulator and the power supply leads.

4. A timing control as set forth in claim 2, wherein the resistive device includes a rheostat connected between the accumulator and the power supply leads.

5. A timing control as set forth in claim 2, and a rectifier connected across the power supply leads supplying direct current to the relay tube and the accumulator.

6. A timing control as set forth in claim 2, and a switch in parallel with the normally-closed relay switch for energizing the power outlet when the relay is energized.

7. A timing control for electrical devices including, a pair of power supply leads, a relay having an armature coil and a normally-closed switch which is closed when the relay is de-energized and a normally-open switch which is open when the relay is de-energized, energization of the relay by energization of the armature coil opening the normally-closed switch and closing the normally-open switch, a power outlet connected to the power supply leads through the normally-closed switch and energized when the relay is de-energized, a cold cathode gas-filled tube having a plate and cathode and a starter electrode, the plate and cathode being connected in series with the relay armature coil so that the relay is energized when a plate current flows through the tube, a rectifier connected to the power supply leads having its negative output lead connected to the tube cathode, a condenser having a positive pole and a negative pole, the negative pole of the condenser being connected to the negative output lead of the rectifier and the positive pole of the condenser being connected to the starter electrode, the positive output lead of the rectifier being connected to the plate, a voltage divider circuit connected across the output leads of the rectifier and having a tap connected to the starter electrode for applying to the latter a positive potential increasing positively as the condenser charges, there being appreciable electrical resistance in the connection between the positive output lead and the positive pole of the condenser, a discharge shunt connected across the condenser through the normally-open switch, and a switch in series with the plate and cathode and armature coil to interrupt the plate current and de-energize the relay thus energizing the power outlet and disconnecting the discharge shunt to permit the condenser to commence charging.

CHARLES W. DAVIS.

REFERENCES CITED

The following references are of record in the file of this patent:

UNITED STATES PATENTS

| Number | Name | Date |
| --- | --- | --- |
| 2,293,425 | Dammond | Aug. 18, 1942 |
| 2,306,237 | Wolfner | Dec. 22, 1942 |
| 2,337,905 | Livingston | Dec. 28, 1943 |
| 2,339,750 | Bartholy | Jan. 25, 1944 |
| 2,360,721 | Rose | Oct. 17, 1944 |
| 2,363,753 | Smith | Nov. 28, 1944 |
| 2,479,274 | Simons | Aug. 16, 1949 |
| 2,492,749 | Hills | Dec. 27, 1949 |
| 2,497,681 | Mayer | Feb. 14, 1950 |
| 2,515,477 | Tellkamp | July 18, 1950 |